US010810685B1

(12) United States Patent
Pei et al.

(10) Patent No.: US 10,810,685 B1
(45) Date of Patent: Oct. 20, 2020

(54) GENERATION OF KEYWORDS FOR CATEGORIES IN A CATEGORY HIERARCHY OF A SOFTWARE PRODUCT

(71) Applicants: Lei Pei, Mountain View, CA (US); Diwakar Kumawat, Mountain View, CA (US); Heidi Yang, Mountain View, CA (US); Mary Farrow, Sunnyvale, CA (US)

(72) Inventors: Lei Pei, Mountain View, CA (US); Diwakar Kumawat, Mountain View, CA (US); Heidi Yang, Mountain View, CA (US); Mary Farrow, Sunnyvale, CA (US)

(73) Assignee: Intuit Inc., Mountain View, CA (US)

( * ) Notice: Subject to any disclaimer, the term of this patent is extended or adjusted under 35 U.S.C. 154(b) by 459 days.

(21) Appl. No.: 15/610,232

(22) Filed: May 31, 2017

(51) Int. Cl.
G06F 16/9535 (2019.01)
G06Q 40/00 (2012.01)

(52) U.S. Cl.
CPC ....... *G06Q 40/123* (2013.12); *G06F 16/9535* (2019.01)

(58) Field of Classification Search
None
See application file for complete search history.

(56) References Cited

U.S. PATENT DOCUMENTS

| 6,704,729 | B1 * | 3/2004 | Klein | G06F 16/338 |
| 7,260,568 | B2 * | 8/2007 | Zhang | G06F 16/3346 707/711 |
| 2003/0126561 | A1 * | 7/2003 | Woehler | G06F 16/355 715/256 |
| 2004/0024739 | A1 * | 2/2004 | Copperman | G06F 16/367 |
| 2007/0027901 | A1 * | 2/2007 | Chan | G06Q 30/02 |
| 2007/0094241 | A1 * | 4/2007 | Blackwell | G06F 16/951 |
| 2009/0055381 | A1 * | 2/2009 | Wu | G06F 17/2745 |
| 2012/0197979 | A1 * | 8/2012 | Palm | G06Q 30/0282 709/203 |
| 2012/0233178 | A1 * | 9/2012 | Oztekin | G06F 16/353 707/748 |
| 2014/0129324 | A1 * | 5/2014 | Spivack | G06Q 30/0269 705/14.45 |

(Continued)

*Primary Examiner* — Aleksandr Kerzhner
*Assistant Examiner* — Eddy Cheung
(74) *Attorney, Agent, or Firm* — Ferguson Braswell Fraser Kubasta PC

(57) ABSTRACT

A method for category search. The method includes determining semantic relationships between terms in a corpus; obtaining, from an expense category hierarchy and for an expense category, a collection of keywords; and expanding the collection with a related keyword according to a semantic relationship of the relationships between the related keyword and a preexisting keyword in the collection. The method further includes extracting a segment from a description of a first historical transaction by a user of the financial product; and adding the extracted segment as an additional keyword to the collection when, for the extracted segment, the minimum of a first and a second confidence-interval bound calculated for a first transaction score and a first user score, respectively, satisfy a first threshold; and returning the name of the expense category in response to a user submitting a first query that comprises at least one the keyword in the collection.

16 Claims, 17 Drawing Sheets

(56) References Cited

U.S. PATENT DOCUMENTS

| | | | |
|---|---|---|---|
| 2015/0019566 A1* | 1/2015 | Jones | G06F 16/3322 |
| | | | 707/748 |
| 2015/0032712 A1* | 1/2015 | Green | G06F 16/951 |
| | | | 707/706 |
| 2018/0089311 A1* | 3/2018 | Soni | G06F 16/9535 |

* cited by examiner

| | A | B | C |
|---|---|---|---|
| 1 | QBSE Category id | QBSE Category name | Guiding blurb |
| 2 | 10001 | Advertising | Cost of promoting and selling your products or services. |
| 3 | 13801 | Apps/software/ web services | Apps, software, and web services you use for self-employed work on your mobile phone or computer. |
| 4 | 10802 | Apps/software/ web services (> $200) | Apps, software, and web services you use for self-employed work on your mobile phone or computer. Possibly a depreciable asset if > $200. |
| 5 | 10005 | Business insurance | Premiums you pay to insure your self-employed business for things like general liability or workers comp. |
| 6 | 11301 | Business licenses | Annual costs for licenses that ou pay to state or local governments. |
| 7 | 14601 | Business loan | Principal portion of a payment on a business loan for self-employed work. (Principal isn't deductible; interest is.) |
| 8 | 10601 | Business loan interest | Interst on a business loan for self-employed work. (Interest is deductible, principal isn't.) |
| 9 | 13802 | Computers | Computers and peripherals you buy for self-employed work. |
| 10 | 11801 | Computers (asset, usually > $200) | Computers and peripherals you buy for self-employed work; possibly a depreciable asset if > $200. |
| 11 | 10004 | Contract labor | Payments you make to others (not employees) for services performed for your self-employed business. |
| 12 | 13807 | Copiers | Copy equipment you use for self-employed work. |
| 13 | 11853 | Copiers (asset, usually > $200) | Copy equipment you use for self-employed work; possibly a depreciable asset if > $200. |
| 14 | 10602 | Credit card interest | Interest charged on a credit card balance. (Only the interest is deductible; the principal isn't.) |
| 15 | 12201 | Credit card payment | Principal portion of payments you make towards a credit card balance. (Principal isn't deductible; interest is.) |
| 16 | 13008 | Equipment rent and lease | Rent or lease of machinery or equipment needed for your self-employed work. |
| 17 | | Estimated taxes | Estimated tax payments you pay on your self-employed income. |
| 18 | 11303 | Federal tax | Tax payments you make to the federal government. |
| 19 | 10018 | Furniture | Cost of furniture you buy for your self-employed workspace. |
| 20 | 11803 | Furniture (asset, usually > $200) | Cost of furniture you buy for your self-employed workspace; possibly a depreciable asset if > $200. |
| 21 | 10205 | Gas and fuel | Gas and fuel costs when driving for self-employed work. |
| 22 | 12151 | Health insurance premium | Premiums you pay for self-employed health insurance. |
| 23 | 12152 | Health Savings Account contribution | Contributions or deposits you make to a health savings account (HSA). |
| 24 | 11702 | Homeowner/rental insurance | Cost of homeowner's or rental insurance when you have a self-employed home office. |
| 25 | 10021 | Income | Money you make from self-employed work, including 1099-MISC and 1099-K income. |
| 26 | 10009 | Legal and professional services | Accountant and attorney fees you pay for self-employed work, including tax prep. |
| 27 | 13002 | Listing fees | Fees you pay to list items on online marketplaces. |
| 28 | 10007 | Meals and entertainment | Meals and entertainment costs for clients directly related to your self-employed work. Or personal, non-local meals while traveling. |
| 29 | 13001 | Memberships/Subscriptions | Fees or dues you pay for membership in professional organizations, unions, subscriptions, and so on. |
| 30 | 13603 | Mortgage | Principal portion of a payment on a mortgage loan for business property. (Principal isn't deductible; interest is.) |
| 31 | 10603 | Mortgage interest | Interest charged on a mortgage for a business property. (Only the interest portion is deductible.) |
| 32 | 14167 | Mortgage (home office) | Principal portion of a payment on a mortgage loan for your home, if you have a home office. (Principal isn't deductible; interest is.) |
| 33 | 12167 | Mortgage interest (home office) | Interest charged on your mortgage when you own your home and have a self-employed home office. (Only the interest portion is deductible.) |
| 34 | 10008 | Office supplies/postage | Cost of office supplies (objects) and expenses (maintenance) of your work space. Includes postage and shipping. |

Figure 3

For each segment, calculate a 'txn score' and 'user score' for each category, using following formula:

Txn_score = (#txn contains this segment in this category + #txn recat by users that contains this segment in this category * recat_weight)/(#txn contains this segment + #txn recat by users that contains this segment * recat_weight) — 503

User_score = #user who have txn contains this segment in this category/#user who have txn contains this segment — 504

If
Min(95% lower bound CI of txn score,
  95% lower bound CI of user score) > 0.5
Then
Include this keyword for this particular category — 505

Figure 5B

Example keyword: kafe     Category: 'Meals & Entertainment'

- #txn: 69
- #txn in 'Meals & Entertainment' : 43
- #txn recat by users: 13
- #txn recat by users in 'Meals & Entertainment': 12
- #user: 30
- #user in 'Meals & Entertainment' : 25
- weight for a user recat txn: 50

{506}

507 => Txn Score = (43+50*12)/(69+ 50*13)=0.894     Lower bound of 95% CI: 0.869

508 => User Score = 25/30=0.833     Lower bound of 95% CI: 0.653

509 => Add 'kafe' to the list of search keywords for 'Meals & Entertainment'

Txn_score = (53+50*12)/(69+50*13) = 653/719 = 0.895 lower bound of 95% confidence level interval: 0.869
User_score = 25/30 = 0.833 lower bound of 95% confidence level interval: 0.653
* http://www.sample-size.net/confidence-interval-proportion/

Figure 5C

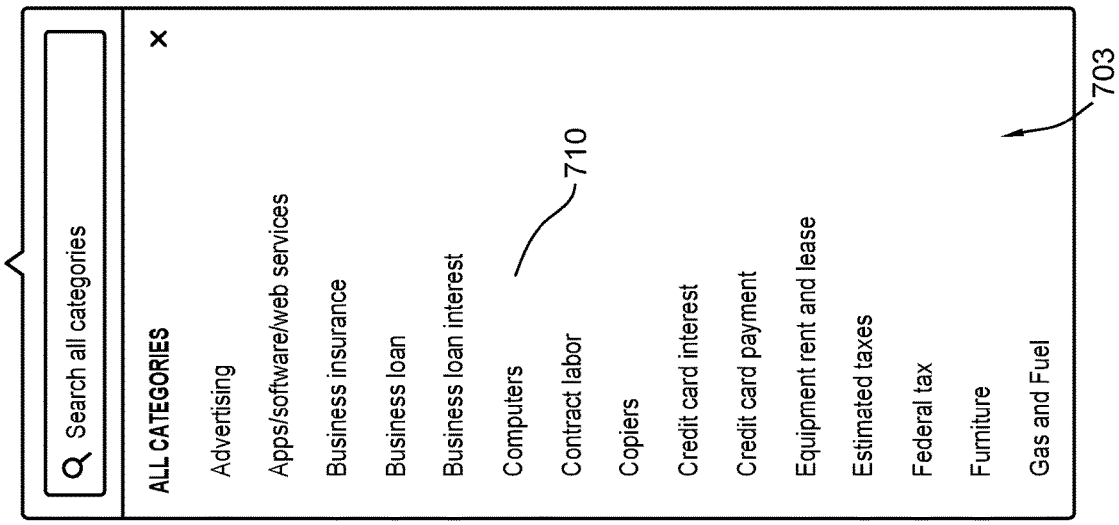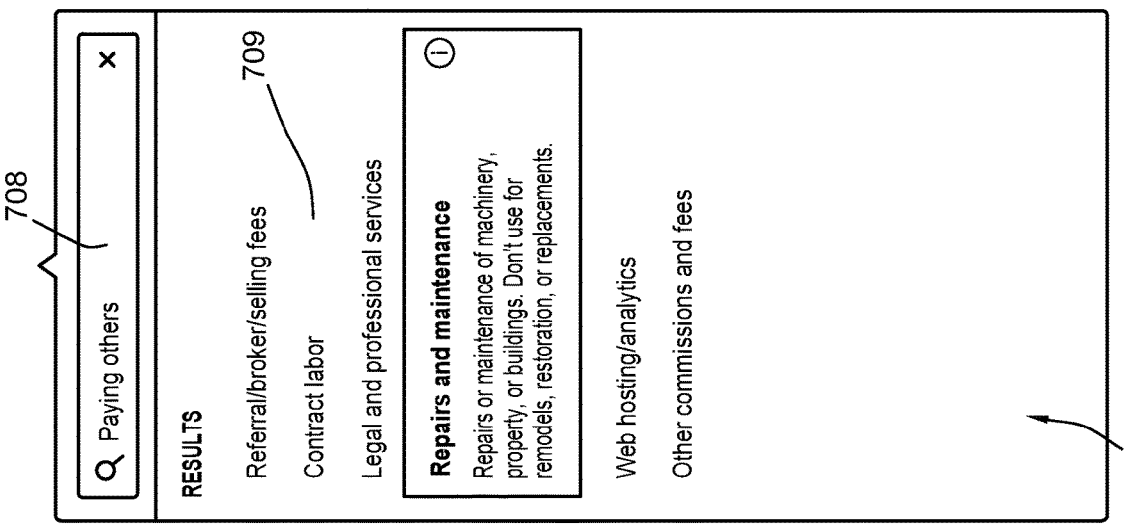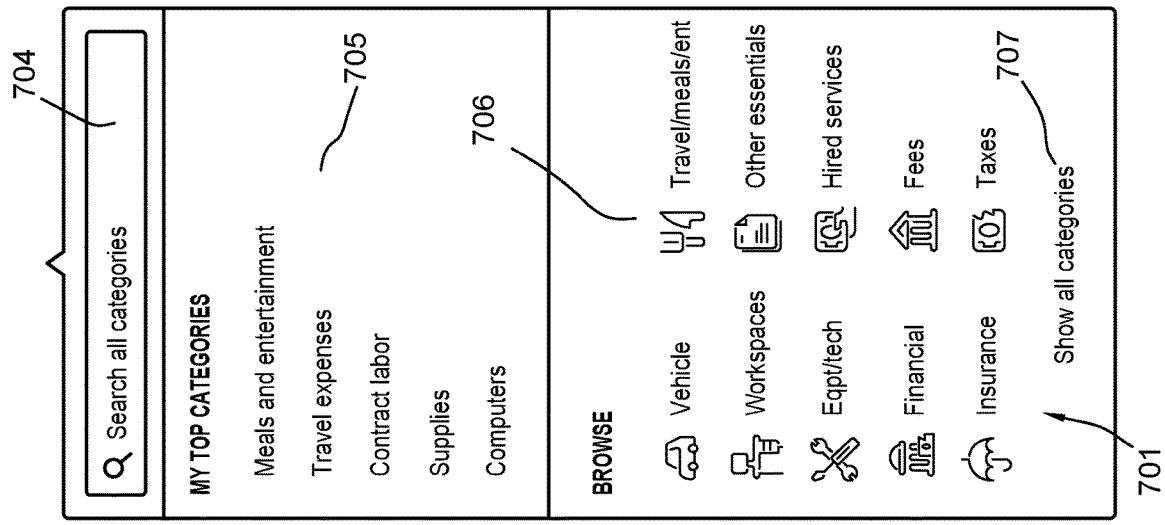
Figure 7A

GENERATION OF KEYWORDS FOR CATEGORIES IN A CATEGORY HIERARCHY OF A SOFTWARE PRODUCT

BACKGROUND

For various reasons, the terminology used in tax regulations tends to be complicated and difficult to understand. This has led to the development of software applications to assist taxpayers.

While such software applications have become increasingly sophisticated, they still require users to categorize their financial transactions with respect to that terminology. This categorization task remains laborious both in terms of time and effort, resulting in long latencies for users.

Consequently, providing computerized assistance to reduce these latencies is an ongoing area of research and experimentation.

SUMMARY

In general, in one aspect, the invention relates to a method for category search. The method includes determining, using clustered computers executing distributed-computing software, a plurality of semantic relationships between a plurality of terms in a corpus; obtaining, from an expense category hierarchy and for an expense category, a collection of keywords comprising a name and additional keywords from a description of the expense category; expanding the collection with a related keyword according to a semantic relationship of the plurality of relationships between the related keyword and a preexisting keyword in the collection, wherein the related keyword and the preexisting keyword are in the plurality of terms. The method further includes using the clustered computers to: extract a segment from a description of a first historical transaction by a first user of the financial product to obtain an extracted segment, for the extracted segment, calculate a first confidence-interval bound for a first transaction score and a second confidence-interval bound for a first user score, and add the extracted segment as an additional keyword to the collection when the minimum of the first confidence-interval bound and the second confidence-interval bound satisfies a first threshold; and returning the name of the expense category in response to a user submitting a first query that comprises at least one the keyword in the collection.

In general, in one aspect, the invention relates to a non-transitory computer readable medium including instructions that enable a system to determine, using clustered computers running distributed-computing software, a plurality of semantic relationships between a plurality of terms in a corpus; obtain, from an expense category hierarchy and for an expense category, a collection of keywords comprising a name and additional keywords from a description of the expense category; expand the collection with a related keyword according to a semantic relationship of the plurality of relationships between the related keyword and a preexisting keyword in the collection, wherein the related keyword and the preexisting keyword are in the plurality of terms; use the clustered computers to: extract a segment from a description of a first historical transaction by a first user of the financial product to obtain an extracted segment, for the extracted segment, calculate a first confidence-interval bound for a first transaction score and a second-confidence-interval bound for a first user score, and add the extracted segment as an additional keyword to the collection when the minimum of the first confidence-interval bound and the second confidence-interval bound satisfies a first threshold; and return the name of the expense category in response to a user submitting a first query that comprises at least one the keyword in the collection.

In general, in one aspect, the invention relates to a system for category search. The system, includes: a hardware processor and memory; software instructions stored in the memory and configured to execute on the hardware processor, which, when executed cause the hardware processor to: display a parent view in a graphical user interface for a financial product, wherein the parent view comprises: a first child view that comprises a control that allows a user to enter a query to search for an expense category in an expense-category hierarchy for the financial product, a second child view that displays a list of search results from the query, and a third child view that displays a personalized list of most-frequently-used expense categories for the user and a group of icons that allows the user to browse the expense-category hierarchy.

Other aspects of the invention will be apparent from the following description and the appended claims.

BRIEF DESCRIPTION OF DRAWINGS

FIG. 3 shows expense-category names and descriptions, in accordance with one or more embodiments.

FIGS. 5A, 5B, and 5C illustrate a process for generating keywords from historical transaction data, in accordance with one or more embodiments.

FIGS. 7A and 7B show GUI views displayed by the financial product, in accordance with one or more embodiments.

DETAILED DESCRIPTION

Figure 1A:
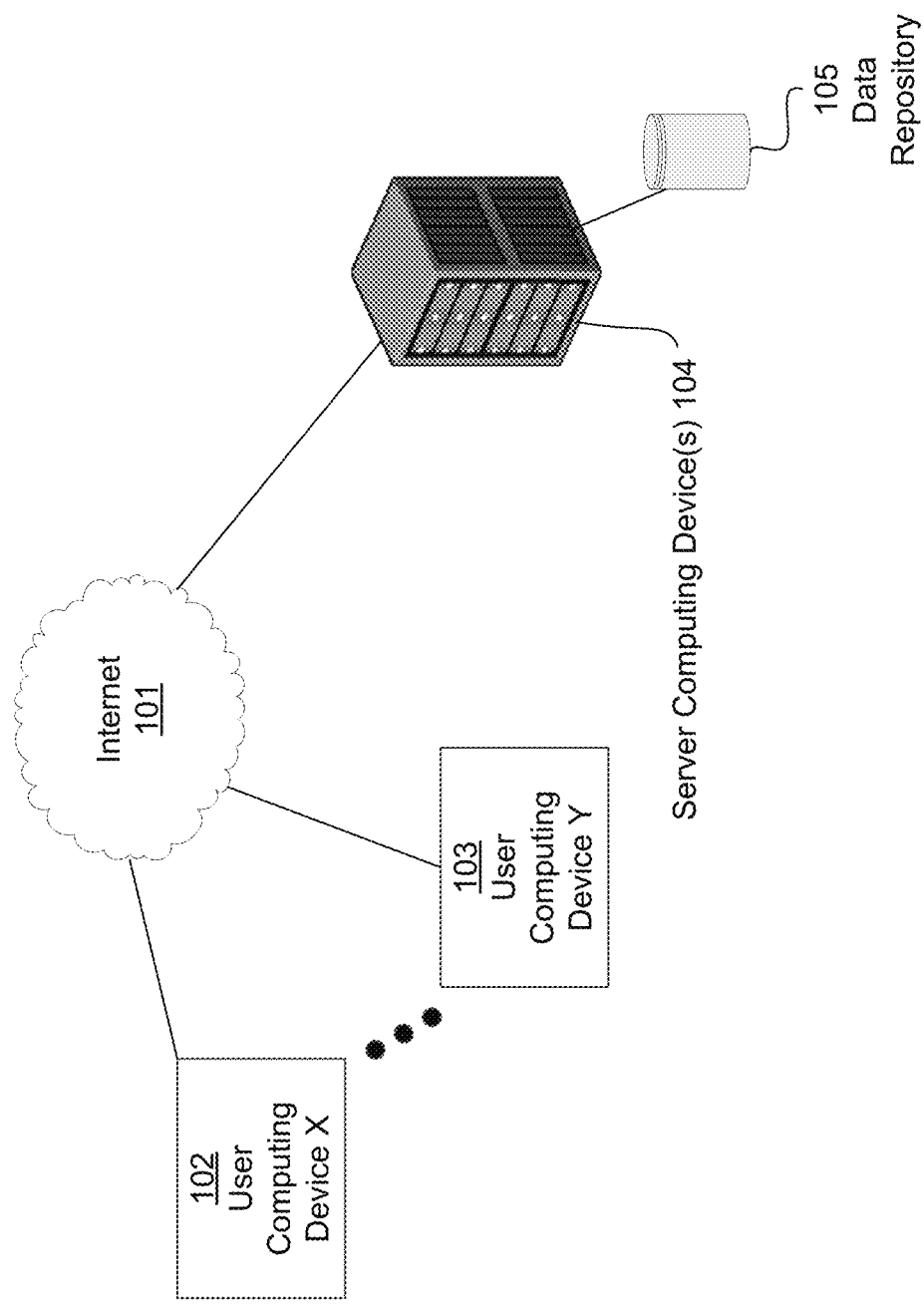
FIG. 1A is a network diagram showing a web service hosting an online financial product, in accordance with one or more embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or proceed) the second element in an ordering of elements.

In general, one or more embodiments of the invention involve a process for generating a list of keywords associated with an expense category in a financial product. In one or more embodiments, the financial product is a massively multi-user online tax product, accounting product, integrated financial management product, or other product that assists users in performing financial operations. In one or more embodiments, software for the financial product obtains an initial collection of keywords for an expense category from a name and a description of the expense category in an expense-category hierarchy. In one or more embodiments, the expense-category hierarchy might be used as a model in a model-view-controller design for a graphical user interface (GUI) displayed by the financial product. The software then expands the initial collection with related keywords generated through the application of distributional-semantics functionality such as Word2Vec or GloVe. In one or more embodiments, the distributional-semantics functionality is based on the semantic relationship between terms in a training corpus such as: (1) WIKIPEDIA®; or (2) data associated with historical transactions input by users of the financial product. In one or more embodiments, the software also expands the collection with related keywords from a lexical dictionary such as WordNet. The software then adds additional keywords to the collection by (1) extracting segments from data associated with the historical financial transactions input by users of the financial product and (2) applying a threshold (e.g., 0.5) to the minimum of a lower-bound 95% confidence interval based on a transaction score and a lower-bound 95% confidence interval based on a user score for each extracted segment.

Once the software has generated keyword collections for all the expense categories in the expense-category hierarchy, the software receives from a user a query that does not include any keywords in any of the keyword collections. In one or more embodiments, the query is received through a search control in the GUI. The software notifies the user that this occurred and returns no results in the GUI. During the same session, the software receives a selection by the user of an expense category for a transaction. The software then adds the keywords in the query to the collection of keywords for the expense category selected by the user.

Through these embodiments, the user latencies described above can be significantly reduced.

FIG. 1A is a network diagram showing a web service hosting an online financial product, in accordance with an example embodiment. As depicted in this figure, user computing device X (102) (e.g., a laptop or other personal computer) and user computing device Y (103) (e.g., a mobile device such as smartphone such as an IPHONE® mobile phone, ANDROID™ operating system phone, WINDOWS® operating system phone, etc., or a tablet computer such as an IPAD® tablet computer) are connected by a network (101) (e.g., a wide area network (WAN) including the Internet, which might be wireless in part or in whole) with a web service (104) hosting a financial product such as a multi-user online tax product that is a part of QUICK-BOOK SELF-EMPLOYED™. In an example embodiment, the online financial product might be massively multi-user (e.g., have thousands or millions of users).

User computing device X (102) and the servers at web service (104) might include (1) hardware consisting of one or more microprocessors (e.g., from the x86 family, the ARM family, or the PowerPC family), volatile storage (e.g., RAM), and persistent storage (e.g., flash memory, a hard disk, or a solid-state drive), and (2) an operating system (e.g., WINDOWS® operating system, MACOS® operating system, LINUX® operating system, WINDOWS SERVER™ operating system, etc.) that runs on the hardware. Similarly, in one or more embodiments, user computing device Y (103) might include (1) hardware consisting of one or more microprocessors (e.g., from the ARM family or the x86 family), volatile storage (e.g., RAM), and persistent storage (e.g., flash memory such as microSD), (2) an operating system (e.g., WINDOWS MOBILE® operating system, ANDROID™ operating system, LINUX® operating system, SYMBIAN OS® operating system, etc.) that runs on the hardware, and (3) one or more accelerometers, one or more gyroscopes, and a global positioning system (GPS) or other location-identifying type capability.

In one or more embodiments, web service (104) might include a number of servers (e.g., racked servers) connected by a network (e.g., a local area network (LAN) or a WAN) to each other in a cluster (e.g., a load-balancing cluster, a HADOOP® cluster, a Beowulf cluster, etc.) or other distributed system which might run web service software (e.g., web-server software, database software, etc.) and distributed-computing and/or cloud software such as Map-Reduce, Google File System, HADOOP® software product, HADOOP® File System product, HADOOP® YARN product, Hive, Dremel, CloudBase, Memcached, REDIS® product, etc. The servers in web service (104) might be connected to data repository (105). Data repository (105) might include flash memory, a redundant array of independent disks (RAID), and/or a storage area network (SAN), in one or more embodiments. Additionally or alternatively, web service (104) and/or data repository (105) might be hosted wholly or partially in a public and/or private cloud, e.g., where the cloud resources serve as a platform-as-a-service (PaaS) or an infrastructure-as-a-service (IaaS).

In one or more embodiments, data repository (105) might be used to store accounting and/or financial data, including accounting and/or financial data related to the current transactions of the users of the online financial product hosted by the servers at the web service (104).

Figure 1B:
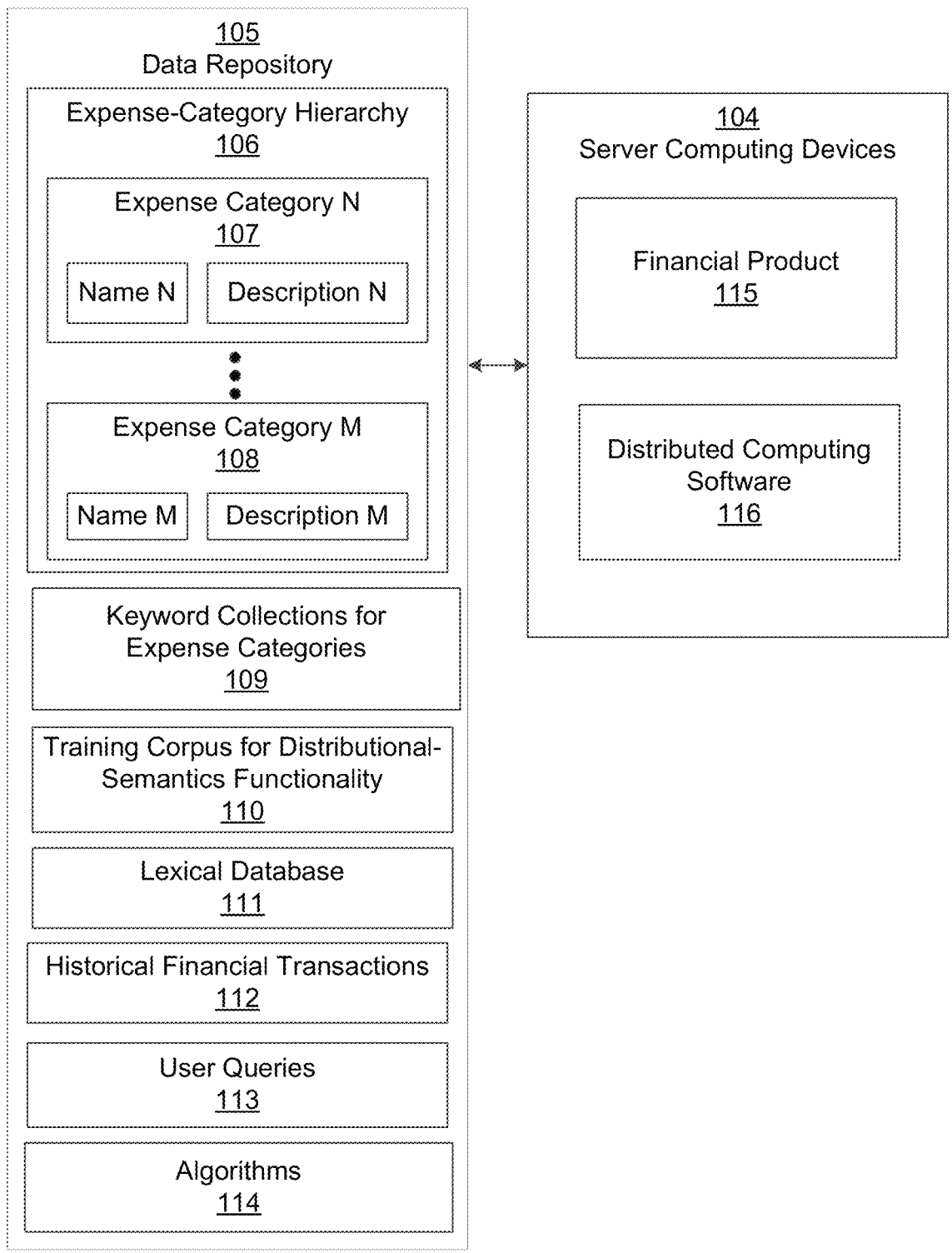
FIG. 1B is a diagram showing the data used by a web service hosting an online financial product, in accordance with one or more embodiments.

Additionally, as shown in FIG. 1B, data repository (105) might be used to store algorithms and data related to the processes described in this disclosure. In one or more embodiments, the algorithms might include algorithms that use the servers of web service (104) to perform distributional semantics, natural language processing (NLP) using n-grams, transaction scoring, user scoring, and computing a lower-bound confidence interval based on a normal distribution. And the data related to the processes described in this disclosure might include, among other things: an expense-category hierarchy and related descriptions, keyword collections for expense categories, a corpus to train distributional-semantics functionality, a lexical database, historical transactions of users of the online financial product, and user queries.

As shown in FIG. 1B, the data repository (105) includes an expense category hierarchy (106) having multiple expense categories (e.g., expense category N (107), expense category M (108)). In one or more embodiments, an expense category might be a category of financial transactions that are related to each other, e.g., conceptually or according to accepted accounting principles such as tax regulations. In one or more embodiments, an expense might involve a financial transaction that is a cash outflow or asset outflow, e.g., a cost. Each expense category includes a name (e.g., name N (109), name M (110)) and a description (e.g., description N (111), description M (112)). The name is a unique identifier of the expense category. The name might be an alphanumeric identifier, a code, or a word or collection of words or other identifier of the expense category. In one or more embodiments, the description might describe the expense category in terms of accepted accounting principles such as tax regulations.

In one or more embodiments, expense categories might be organized into an expense-category hierarchy. In one or more embodiments, the uppermost level of the expense-category hierarchy might be group categories. The bottommost level of the expense category might be individual expense categories that are sub-categories of particular group category. In other words, the parent child relationship between expense categories in the expense category hierarchy is based on the child being a subcategory of the parent. Thus, the child expense category conceptually is included in a corresponding parent group category. For example, "Insurance" might be the group category and "Homeowner/rental insurance" and "Vehicle insurance" might be included in the individual categories under "Insurance".

As shown in FIG. 1B, the data repository (105) also includes keyword collections for expense categories (109), e.g., for group expense categories and for individual expense categories. In one or more embodiments, the keyword collections are groups of keywords assigned to a particular expense category by accepted accounting principles such as tax regulations, lexical analysis, semantic analysis, the developers of a financial product including accounting and tax professionals, users of a financial product, etc. An example of a keyword associated with the individual category "Vehicle insurance" might be "deductible". The keywords in the keyword collection assigned to an expense category may be used by users to search for the expense category. In other words, a user may submit a query to find an expense category using the keywords or forms of the keywords for the expense category, and the result of the search is any expense category having the queried keywords in the corresponding keyword collection.

Figure 4A:
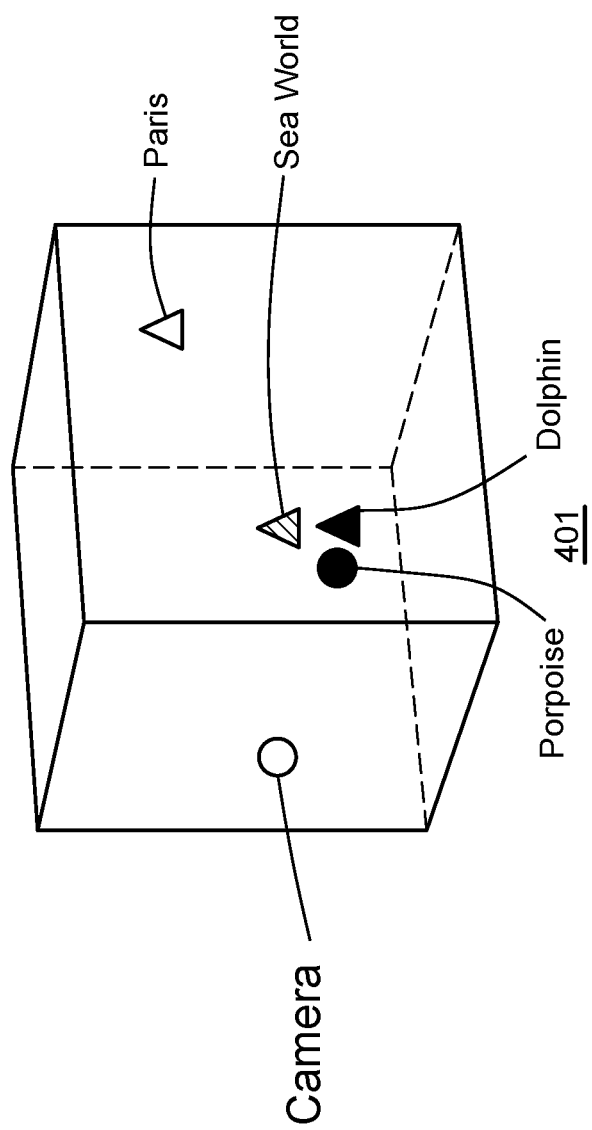
FIG. 4A is a diagram showing a distance space that illustrates Word2Vec functionality, in accordance with one or more embodiments.

As shown in FIG. 1B, the data repository (105) also includes a training corpus for distributional-semantics functionality. In one or more embodiments, a training corpus might be a vast collection of terms (e.g., words or groupings of words) such as the terms in the entries in WIKIPEDIA® database. The training corpus serves as an input into the distributional-semantics functionality, in one or more embodiments. As used in this disclosure, "distributional-semantics functionality" is to be broadly construed to mean a trained distributional-semantic model as described in Andrey Kutuzov's "Distributional Semantics: Extracting Meaning from Data, Lecture 1: Linguistic Foundations of Distributional Semantics (University of Oslo, 26 Oct. 2016) (hereafter "Distributional Semantics"), which is incorporated herein by reference. As noted there, in distributional semantics, meanings of particular words are represented as vectors or arrays of real values derived from the frequency of their co-occurrences with other words in the training corpus. These words (or their "lemmas" as that term is used in morphology and lexicography) can be thought of as vectors or points in multi-dimensional semantic space. Such a semantic space 401 is shown in FIG. 4A, which is from Distributional Semantics, for illustrative purposes. The closeness or similarity of words in semantic space (401) is typically measured using cosine similarity.

Figure 4B:
FIG. 4B is a table showing a co-occurrence matrix that illustrates Word2Vec functionality, in accordance with one or more embodiments.

At the same time, words are also axes (dimensions) in this semantic space. Each word A is represented with the vector A. Vector dimensions or components are other words of the corpus' lexicon (B; C; D . . . N). Values of components are frequencies of words co-occurrences. In the simplest case, co-occurrences are just words occurring next to or near each other in text from the corpus. FIG. 4B, also from Distributional Semantics shows a symmetric word-word co-occurrence matrix (402), for illustrative purposes.

In an example embodiment, the distributional-semantics functionality might be open-source software, such as (1) Word2Vec at Google Code, which is based on Mikolov et al., "Efficient Estimation of Word Representations in Vector Space" (Sep. 7, 2013) (hereafter "Mikolov") or (2) GloVe, which is based on Pennington et al., "GloVe (Global Vectors for Word Representation)" (2014) (hereafter "Pennington"). The (1) documentation for Word2Vec, (2) Mikolov, and (3) Pennington are incorporated herein by reference.

Figure 4C:
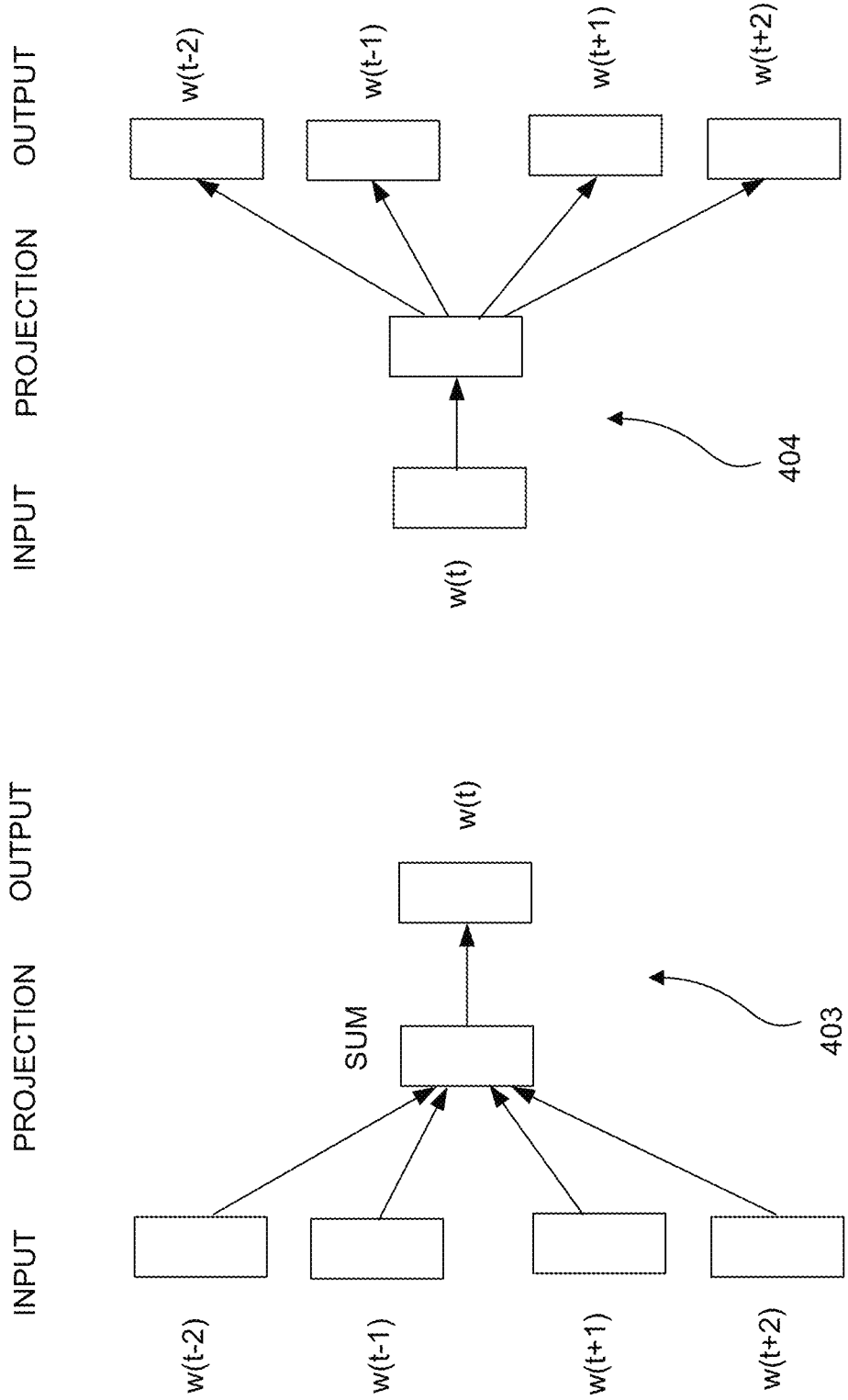
FIG. 4C depicts a continuous bag-of-words model and a continuous skip-gram model that might be used to support Word2Vec functionality, in accordance with an example embodiment.

As noted in Mikolov, Word2Vec has two alternative models, e.g., a continuous bag-of-words (CBOW) model and a continuous skip-gram model. Diagram 401 in FIG. 4C illustrates the CBOW model, where a word (e.g., w(t)) is projected from an input context that consists of the words that precede (e.g., w(t−1)) and follow (e.g., w(t+1)) the word, e.g. in a phrase or sentence. Diagram 402 in FIG. 4C illustrates the continuous skip-gram model, where the preceding (e.g., w(t−1)) and following contextual words (e.g., w(t+1)) in a phrase or sentence are projected from an input word (e.g., w(t)).

As shown in FIG. 1B, the data repository (105) also includes a lexical database (111). In one or more embodiments, the lexical database (111) might be WordNet database, which one might think of as a combination of a dictionary and thesaurus that groups nouns, verbs, adjectives and adverbs into sets of cognitive synonyms (synsets), each expressing a distinct concept. Synsets are interlinked by means of conceptual-semantic and lexical relations. As noted by the creators of WordNet, the main relation among words in WordNet is synonymy, as between the words shut and close or car and automobile.

As shown in FIG. 1B, the data repository (105) also includes historical financial transactions (112). In one or more embodiments, the historical financial transactions might be financial transactions that users of the financial product have previously input into the financial product and classified using the financial product. For example, a user might have previously input a financial transaction involving a purchase of a lunch using a credit card.

As shown in FIG. 1B, the data repository (105) also includes historical user queries (113). In one or more embodiments, the historical user queries might be queries that users enter through a control in a view in a graphical user interface (GUI) of the financial product, where the controls supports searching for expense categories. For example, a user might enter the word "deductible" in the control and results returned might include the individual category "Vehicle insurance" might be returned.

Finally, as shown in FIG. 1B, the data repository (105) also includes algorithms (114). In one or more embodiments, these algorithms might be used by the financial product (115) and/or the distributed computing software (116). These algorithms include the algorithms that are the processes described in the figures discussed below.

In one or more embodiments, the data repository (105) includes multiple different storage units and/or devices. The multiple different storage units and/or devices may or may not be of the same type or located at the same physical site.

Returning to FIG. 1A, in one or more embodiments, user computing device X (102) and user computing device Y (103) might each include a browser as an application program or as part of an operating system. Examples of browsers that might execute on user computing device X (102) include INTERNET EXPLORER® browser, MOZILLA FIREFOX® browser, SAFARI® browser, and GOOGLE CHROME' browser. Examples of browsers that might execute on user computing device Y (103) include SAFARI® browser, MOZILLA FIREFOX® browser, and Android™ browser. It will be appreciated that users of user computing device X (102) and/or user computing device Y (103) might use browsers to access web service (104), e.g., to perform accounting and/or financial transactions. Additionally or alternatively, users of user computing device X (102) and/or user computing device Y (103) might use other application programs or apps to access web service (104).

Figure 2A:
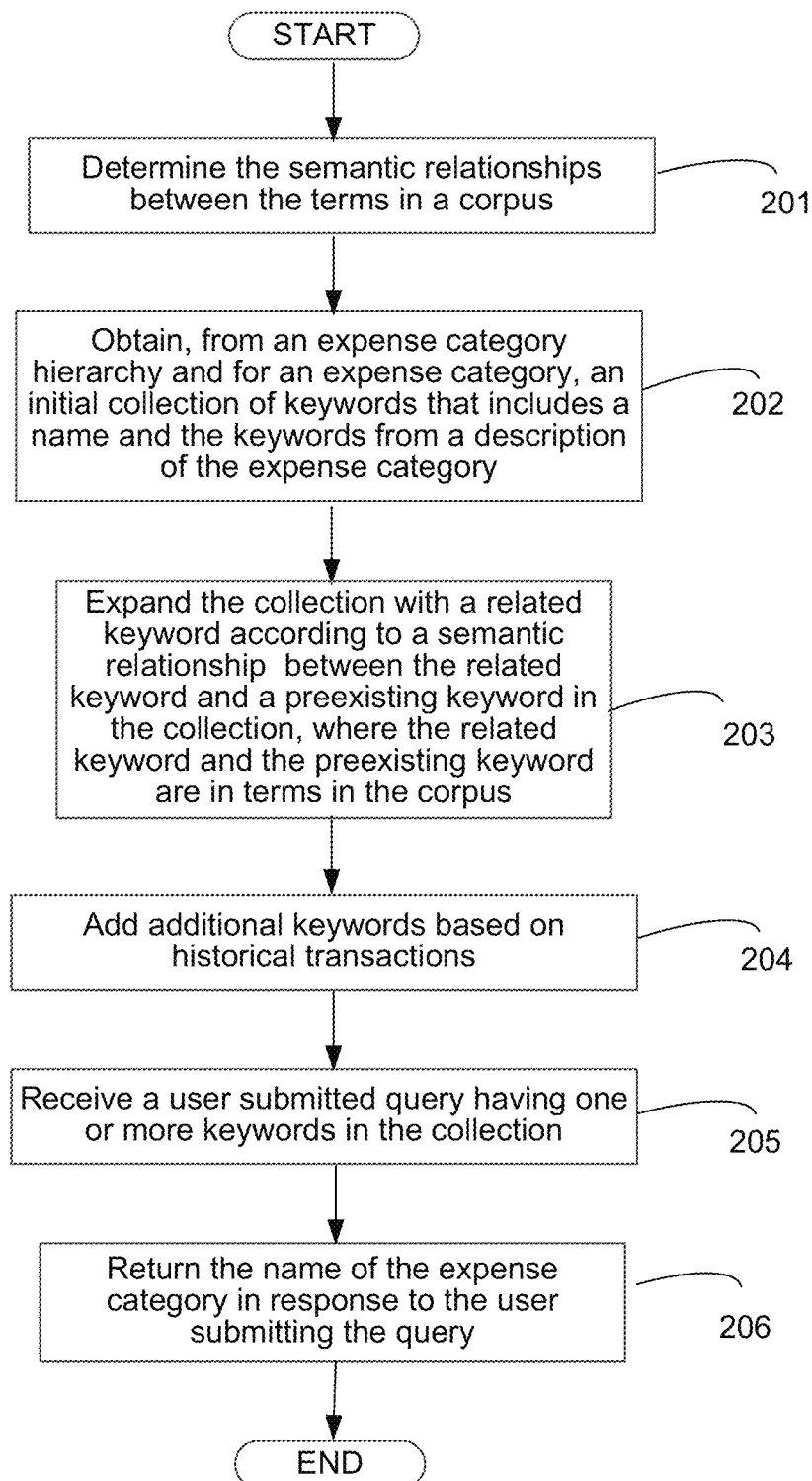
FIG. 2A is a flowchart diagram of a process that enables a user to search for an expense category using keywords, in accordance with one or more embodiments.

FIG. 2A is a flowchart diagram of a process that enables a user to search for an expense category using keywords, in accordance with one or more embodiments. In one or more embodiments, the operations shown in this figure might be performed by software running on servers at web service (104) using data repository (105) (as depicted and described in relation to FIG. 1A). In one or more embodiments, one or more of the operations shown in this figure might be performed on clustered computers running distributed-computing software that supports batch processing based on a Map-Reduce architecture (e.g., HADOOP®). In one or more embodiments, one or more of the operations shown in this figure might be performed on clustered computers running distributed-computing software that supports stream processing based on a Map-Reduce architecture (e.g., HADOOP® YARN architecture). In one or more embodiments, some of the operations shown in this figure might be performed by software (e.g., a client application including, for example, a webpage with embedded JAVASCRIPT® scripting language program code or ACTIONSCRIPT® scripting language program code) running on a client device (e.g., user computing device X (102) or user computing device Y (103)).

While the various operations in this flowchart and the flowcharts below are presented and described sequentially, one of ordinary skill will appreciate that some or all of the operations may be executed in different orders, may be combined or omitted, and some or all of the operations may be executed in parallel. Furthermore, the operations may be performed actively or passively. For example, some operations may be performed using polling or be interrupt-driven in accordance with one or more embodiments of the invention. By way of an example, determination operations may not require a processor to process an instruction unless an interrupt is received to signify that a condition exists, in accordance with one or more embodiments of the invention. As another example, determination operations may be performed by performing a test, such as checking a data value to test whether the value is consistent with the tested condition, in accordance with one or more embodiments of the invention.

As depicted in FIG. 2A, the software (e.g., the software running on servers at web service (104)) determines (e.g., using distributional-semantics functionality) the semantic relationships between the terms (or words) in a corpus, in operation 201. In operation 202, the software obtains an initial collection of keywords for an expense category (e.g., Meals & Entertainment) from the names and descriptions in an expense-category hierarchy. In one or more embodiments, the expense-category hierarchy might be a component of a financial product (e.g., an online tax service) that uses expense categories. In operation 203, the software expands the collection with a related keyword according to a semantic relationship between the related keyword and a preexisting keyword in the collection, where the related keyword and the preexisting keyword are terms in the corpus. In operation 204, the software adds additional keywords to the collection based on historical transactions of users of the financial product. In operation 205, the software receives a user query, e.g., through a control in a view in a graphical user interface for the financial product. The user query contains one of the keywords in the collection. Then in operation 206, the software returns the name of the expense category, e.g., through the control.

Figure 2B:
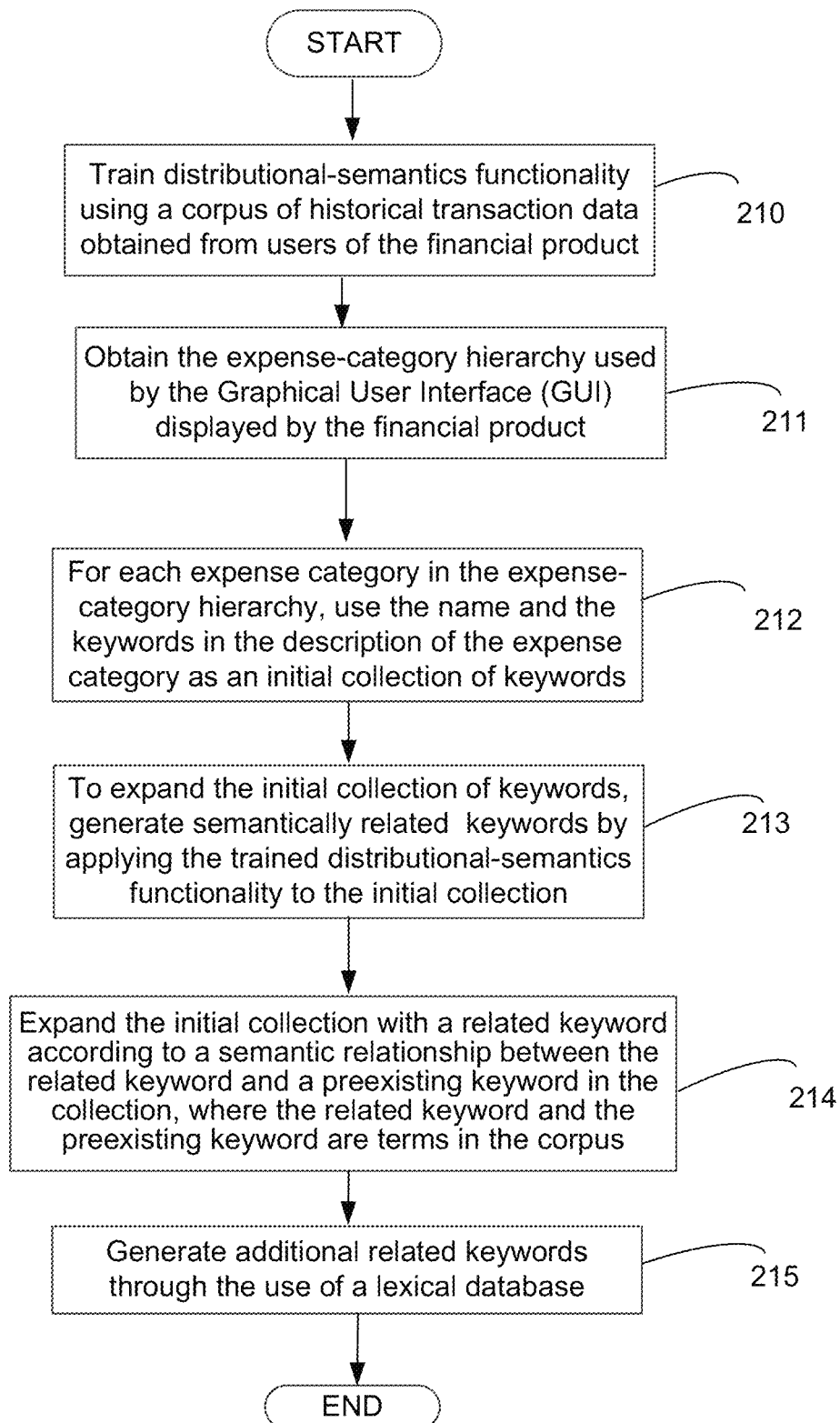
FIG. 2B is a flowchart diagram of a process that expands a collection of keywords using distributional-semantics functionality and a lexical database, in accordance with one or more embodiments.

FIG. 2B is a flowchart diagram of a process that expands a collection of keywords using distributional-semantics functionality and a lexical database, in accordance with one or more embodiments. Here again, in one or more embodiments, the operations shown in this figure might be performed by software running on servers at web service (104) using data repository (105) (as depicted and described in relation to FIG. 1A). In one or more embodiments, one or more of the operations shown in this figure might be performed on clustered computers running distributed-computing software that supports batch processing based on a Map-Reduce architecture (e.g., HADOOP® architecture). In one or more embodiments, one or more of the operations shown in this figure might be performed on clustered computers running distributed-computing software that supports stream processing based on a Map-Reduce architecture (e.g., HADOOP® YARN architecture). In one or more embodiments, some of the operations shown in this figure might be performed by software (e.g., a client application including, for example, a webpage with embedded JAVASCRIPT® scripting language program code or ACTIONSCRIPT® scripting language program code) running on a client device (e.g., user computing device X (102) or user computing device Y (103)).

As depicted in FIG. 2B, the software (e.g., the software running on servers at web service 104) trains distributional-semantics functionality (e.g., Word2Vec or GloVe) using a corpus of historical transaction data obtained from users of the financial product, in operation 210. Additionally or alternatively, the software might use WIKIPEDIA® database as a corpus to train the distributional-semantics functionality. In operation 211, the software obtains the expense-category hierarchy used by the GUI displayed by the financial product. For each category in the expense-category hierarchy, the software uses the category name and the keywords in the category description as an initial collection of keywords for that category, in operation 212. To expand the initial collection of keywords, the software generates related keywords by applying the trained distributional-semantics functionality to the initial collection, in operation 213. In operation 214, the software expands the initial collection with a related keyword according to a semantic relationship between the related keyword and preexisting keyword in the collection, where the related keyword and the preexisting keyword are terms in the corpus. Then, in operation 215, the software generates additional related keywords through the use of a lexical database (e.g., WordNet).

In one or more embodiments, the collection of keywords associated with an expense category might be personalized on a per user basis.

Figure 2C:
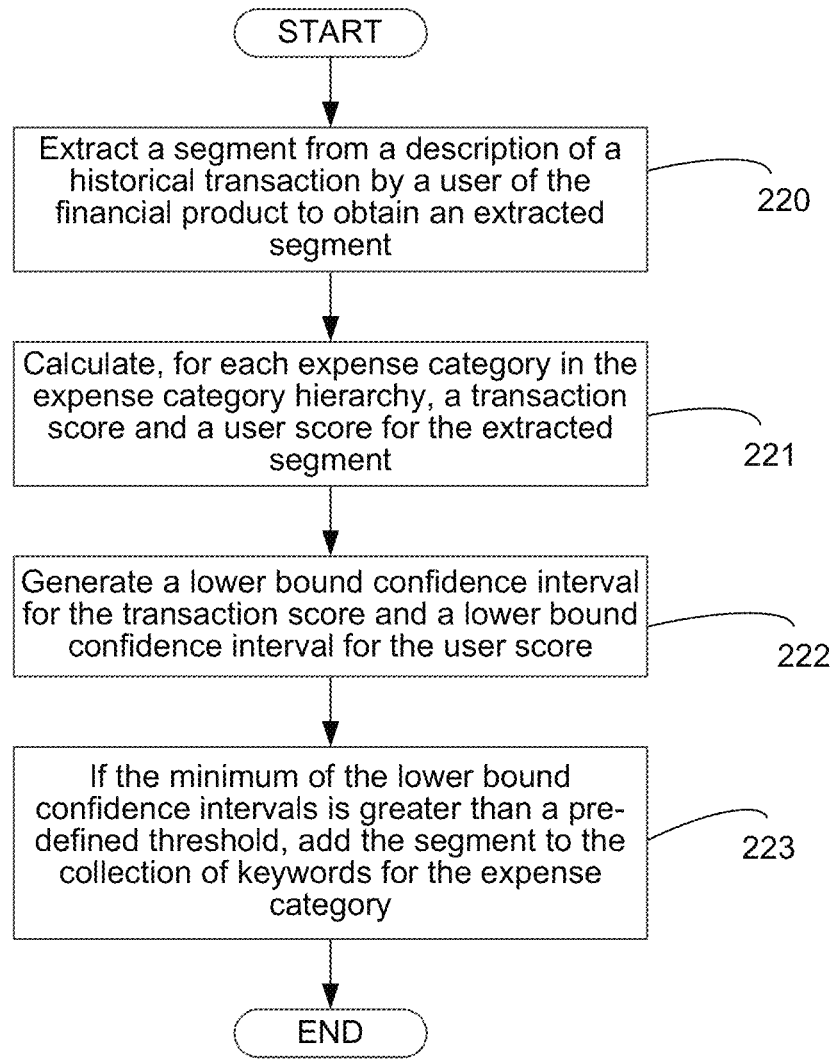
FIG. 2C is a flowchart diagram of a process that expands a collection of keywords using data associated with the historical transactions of users of a financial product, in accordance with one or more embodiments.

FIG. 2C is a flowchart diagram of a process that expands a collection of keywords using data associated with the historical transactions of users of a financial product, in accordance with one or more embodiments. Here again, in one or more embodiments, the operations shown in this figure might be performed by software running on servers at web service (104) using data repository (105) (as depicted and described in relation to FIG. 1A). In one or more embodiments, one or more of the operations shown in this figure might be performed on clustered computers running distributed-computing software that supports batch processing based on a Map-Reduce architecture (e.g., HADOOP® architecture). In one or more embodiments, one or more of the operations shown in this figure might be performed on clustered computers running distributed-computing software that supports stream processing based on a Map-Reduce architecture (e.g., HADOOP® YARN architecture). In one or more embodiments, some of the operations shown in this figure might be performed by software (e.g., a client application including, for example, a webpage with embedded JAVASCRIPT® scripting language or ACTIONSCRIPT® scripting language) executing on a client device (e.g., user computing device X (102) or user computing device Y (103)).

As depicted in FIG. 2C, the software (e.g., the software running on servers at web services 104) extracts a segment (e.g., an n-gram) from data associated with a historical transaction of a user of the financial product, in operation 220. In operation 221, the software calculates a transaction score and a user score for the segment for each expense category in the expense-category hierarchy. In operation 222, the software generates a lower bound confidence interval (e.g., a lower bound 95% confidence interval) for the transaction score and a lower bound confidence interval (e.g., a lower bound 95% confidence interval) for the user score, e.g., using the scores' respective normal distributions. In one or more embodiments, the lower bound confidence interval might be some other percentage, e.g., a lower bound 85% confidence interval or a lower bound 90% confidence interval. Then in operation 223, the software adds the segment to the collection of keywords for the expense category if the minimum of the lower bound confidence intervals is greater than a pre-defined threshold (e.g., 0.5).

Figure 2D:
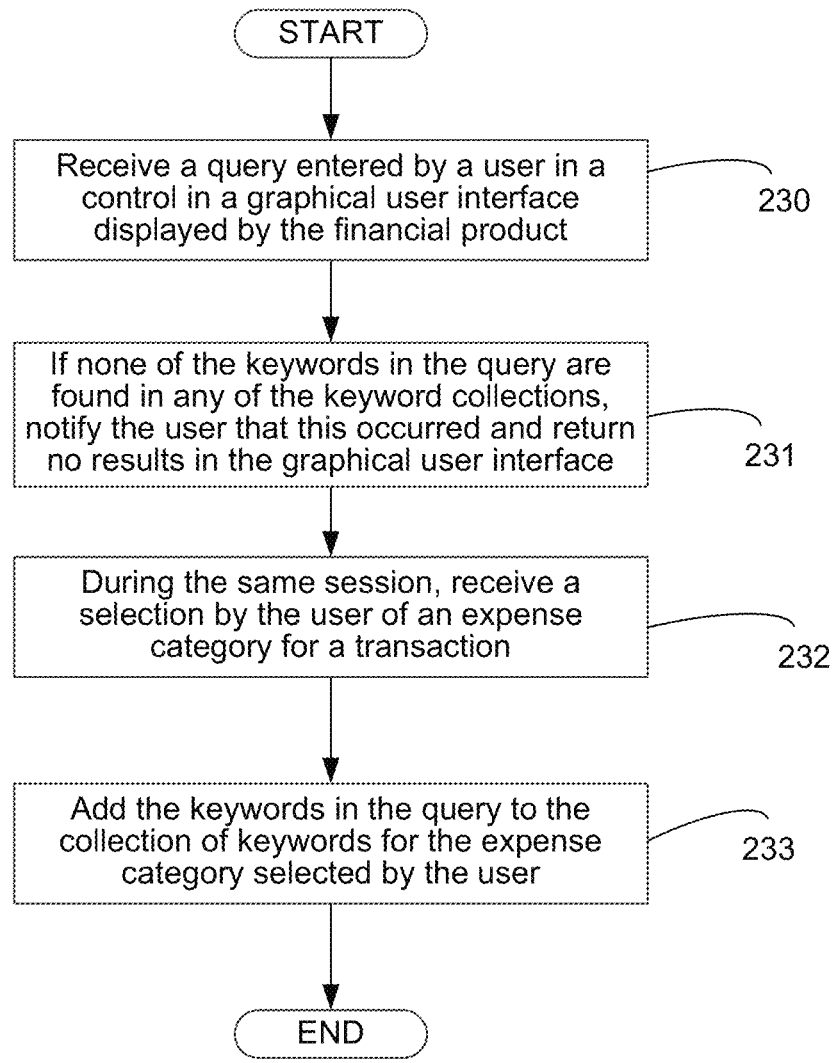
FIG. 2D is a flowchart diagram of a process that expands a collection of keywords using queries of users of a financial product, in accordance with one or more embodiments.

FIG. 2D is a flowchart diagram of a process that expands a collection of keywords using queries of users of a financial product, in accordance with one or more embodiments. Here again, in one or more embodiments, the operations shown in this figure might be performed by software running on servers at web service (104) using data repository (105) (as depicted and described in relation to FIG. 1A). In one or more embodiments, one or more of the operations shown in this figure might be performed on clustered computers running distributed-computing software that supports batch processing based on a Map-Reduce architecture (e.g., HADOOP® architecture). In one or more embodiments, one or more of the operations shown in this figure might be performed on clustered computers running distributed-computing software that supports stream processing based on a Map-Reduce architecture (e.g., HADOOP® YARN architecture). In one or more embodiments, some of the operations shown in this figure might be performed by software (e.g., a client application including, for example, a webpage with embedded JAVASCRIPT® scripting language program code or ACTIONSCRIPT® scripting language program code) executing on a client device (e.g., user computing device X (102) or user computing device Y (103)).

As depicted in FIG. 2D, the software (e.g., the software running on servers at web services 104) receives a query entered by a user in a control in graphical user interface (GUI), in operation 230. If none of the keywords in the query are found in any of the keyword collections, the software notifies the user that this occurred and returns no results, e.g., using a view in the GUI, in operation 231. During the same session (e.g., as determined by lack of a command terminating the session, proximity in time, etc.), the software receives a selection by the user (e.g., through a view in the GUI) of an expense category for a transaction, in operation 232. Then, in operation 233, the software adds the keywords in the query to the collection of keywords for the expense category selected by the user.

FIG. 3 shows an example of expense-category names and descriptions, in accordance with one or more embodiments. It will be appreciated that the software (e.g., the software running on servers at web services (104)) uses such names and descriptions as the initial collection of keywords for an expense category in operation 201 in the process shown in FIG. 2A and in operation 210 in the process shown in FIG. 2B. Table 301 in FIG. 3 has three columns. The first column 302 contains a numeric identifier associated with an expense category. So for example, the numeric identifier for the expense category named "Meals and entertainment" is 10007. The second column 303 contains a text string that is the name associated with an expense category. As just noted, "Meals and entertainment" is a name of an expense category and is included in column 303. The third column 304 contains a text string that is a description associated with an expense category. The description for the "Meals and entertainment" expense category reads: "Meals and entertainment costs for clients directly related to your self-employed work. Or personal, non-local meals while traveling." In one or more embodiments, the description for an expense category might have been written by an accounting or tax professional. For a particular expense category, e.g., 10007, the text string in column 303 and the text string in column 304 might be included in the initial collection of keywords for the expense category. In one or more embodiments, the software might remove stop words such as "Or", e.g. using a stop-word dictionary, before including the text strings. In an example embodiment, the name associated with an expense category and/or the description associated with an expense category might be displayed to a user of the financial product in a GUI view displayed by the software product. In one or more embodiments, Table 301 might be a component of the expense-category hierarchy.

Figure 5A:
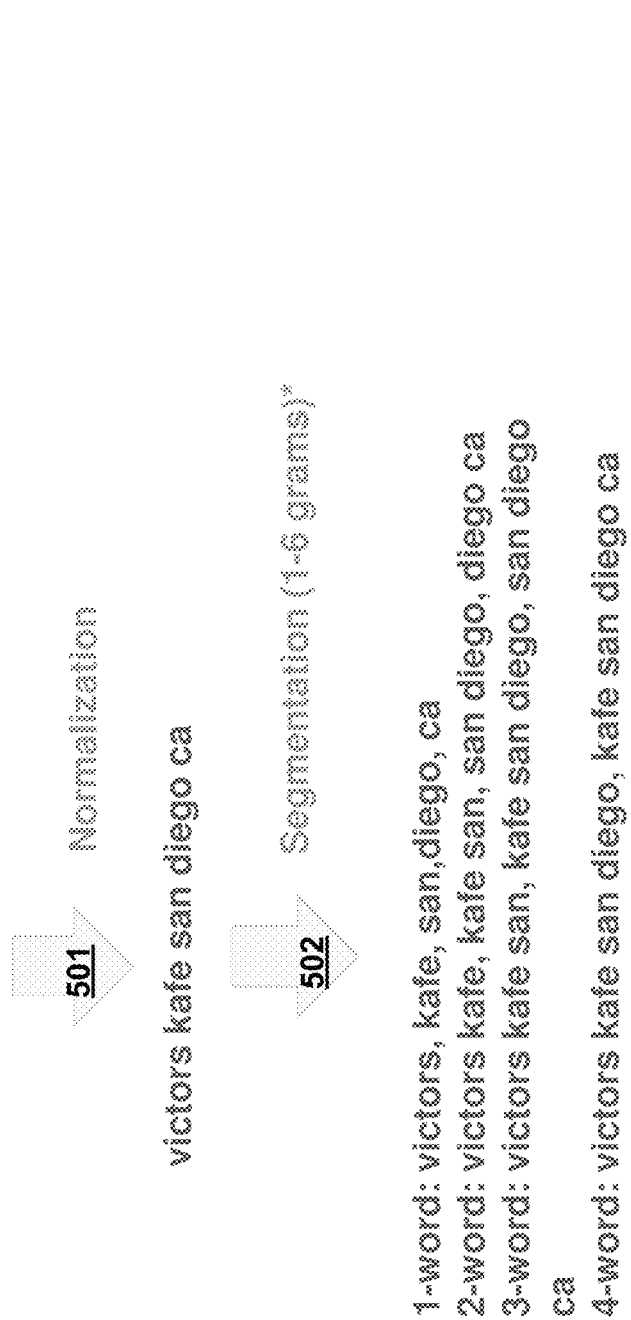

FIGS. 5A, 5B, and 5C illustrate a process for generating keywords from historical transaction data, in accordance with one or more embodiments. It will be appreciated that these figures provide additional details as to operation 203 in the process shown in FIG. 2A and the operations for the processes shown in FIGS. 2C and 2D. As shown in FIG. 5A, the description for a transaction is "CHECKCARD 1211 VICTORS CAFÉ San Diego Calif. 24493985346091657000434" and the candidate expense category is "Meals & Entertainment". In the first step 501 of the process, the software (e.g., the software running on servers at web services 104) normalizes the description through removal of all numeric strings, e.g., "1211" and "24493985346091657000434", resulting in the lowercase string "victors kafe san diego ca". Then the software segments the lowercase string into n-gram segments, where the n-gram might include unigrams, bigrams, trigrams, four-grams, five-grams, and six-grams, etc., in one or more embodiments. As shown in FIG. 5A, the unigram segments are "victor", "kafe", "san", "diego", and "ca" and the four-gram segments include "victors kafe san diego" and "kafe san diego ca".

As shown in FIG. 5B, the software then calculates a transaction score 503 and a user score 504 for each segment with respect to each category. The transaction score 503 is equal to a quotient in which: (1) the numerator is the number of transactions which contain this segment in this category plus the number of transactions re-categorized by users which contain this segment in this category multiplied by a re-categorization weight that is greater than 1 to assign higher weights to the latter number; and (2) the denominator is the number of transactions that contain this segment plus the number of transactions re-categorized by users which contain this segment multiplied by a re-categorization weight that is greater than 1 to assign higher weights to the latter number. As indicated in FIG. 5B, the purpose of the re-categorization weight is to recognize that category labeling resulting from intervention (e.g., active relevance feedback) by a user is more reliable than other category labeling (e.g., passive relevance feedback).

In turn, the user score 504 is equal to a quotient in which: (1) the numerator is the number of users who have a transaction which contains this segment in this category, and (2) the denominator is the number of users who have a transaction that contains this segment. In one or more embodiments, the transaction score 503 and the user score 504 are then used in a confidence-interval calculation 505, e.g., based on the scores' respective normal distributions. For each category, this calculation uses the minimum of the lower-bound 95% confidence interval for the transaction score 503 and the lower-bound 95% confidence interval for the user score 504; if that minimum is greater than 0.5, then the segment (or keyword) is included in the category.

FIG. 5C is an example showing the process that was followed to add the term "kafe" to the category "Meals and Entertainment". In operation 506, the software performs the counts used in the transaction score and the user score for this category. As indicated, the term "kafe" occurs in 64 transactions in all categories, including 43 transactions in the "Meals and Entertainment" category. Users re-categorized the term in 13 transactions in all categories, including 12 re-categorizations in the "Meals and Entertainment" category. In all categories, there were 30 users who had a transaction that used this term, including 25 users who had a transaction that used this term in the "Meals and Entertainment" category. The weight applied as the re-categorization weight is 50.

In operation 507, the transaction score is calculated to be 0.894 and the lower-bound 95% confidence interval for the transaction score is calculated to be 0.869. In operation 508, the user score is calculated to be 0.833 and the lower-bound 95% confidence interval for the user score is calculated to be 0.653. Since 0.653 is greater than 0.5, the term "kafe" is added to the list of keywords for the "Meals and Entertainment" category.

Figure 6:
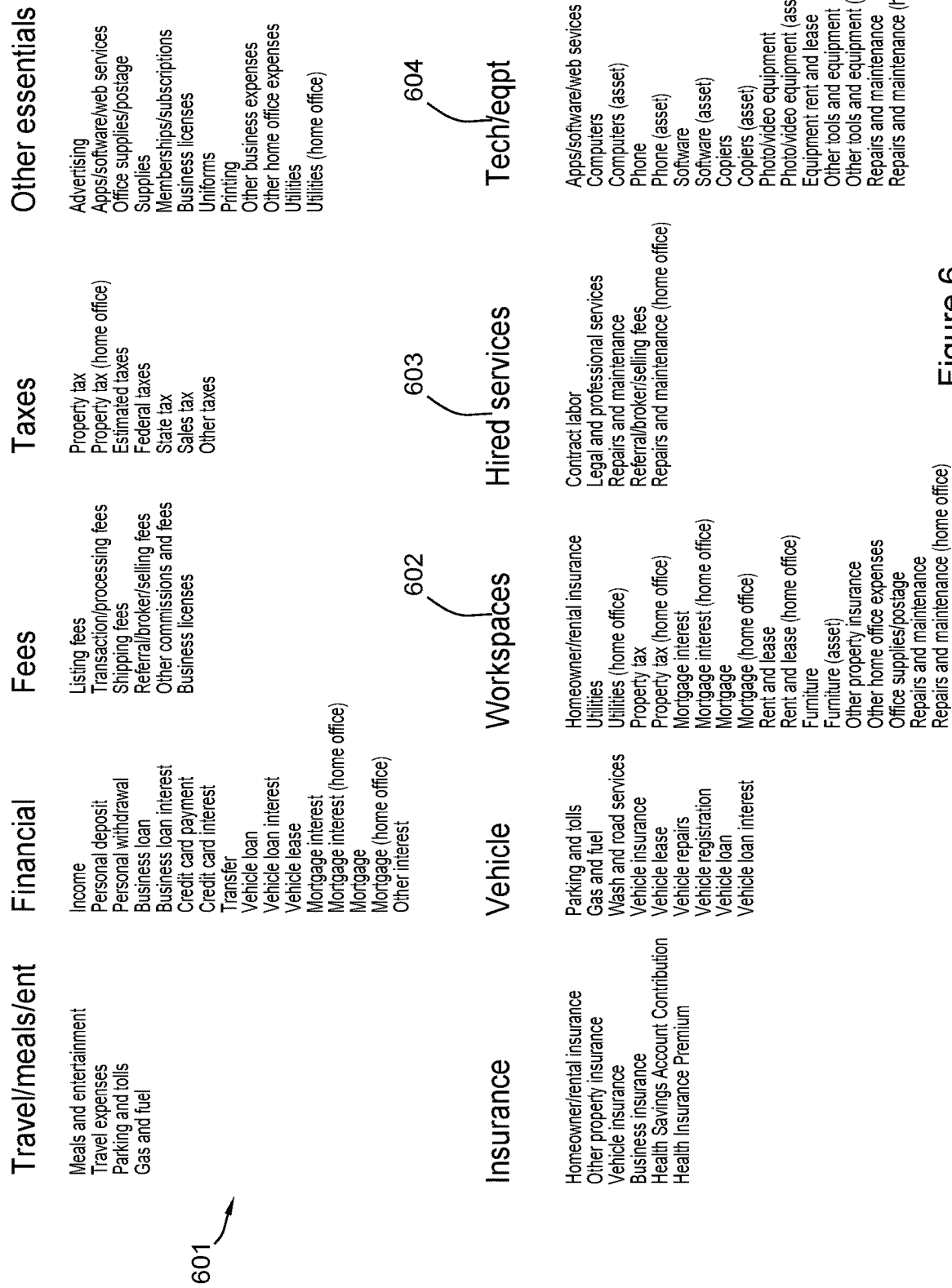
FIG. 6 shows an expense-category hierarchy, in accordance with one or more embodiments.

FIG. 6 shows an expense-category hierarchy, in accordance with one or more embodiments. It will be appreciated that the names of the individual or bottom-level expense categories in this hierarchy are part of the initial collection of keywords for an expense category, as discussed above. As shown in FIG. 6, expense-category hierarchy 601 includes ten group or top-level categories: (1) Travel/meals/ent; (2) Financial; (3) Fees, (4) Taxes; (5) Other essentials; (6) Insurance; (7) Vehicle; (8) Workspaces; (9) Hired Services; and (10) Tech/eqpt. These ten group categories were selected through the use of focus groups and quantitative online surveys. In one or more embodiments, there might be less or more than ten group categories. As shown in the figure, the individual or bottom-level categories might fall under more than one group or top-level category, in one or more embodiments. Thus, the individual category "Repairs and maintenance (home office)" is shown as 602 under group category Workspaces, 603 under group category Hired Services, and 604 under group category Tech/eqpt.

It will be appreciated that expense-category hierarchy 601 might serve as the model in the model-view-controller design for the GUI displayed by the financial product, in one or more embodiments. The GUI is described in detail below. Additionally or alternatively, the expense-category hierarchy itself might be displayed as a view in the GUI.

In one or more embodiments, the expense-category hierarchy might be made industry-specific through the application of machine-learning (e.g., clustering techniques or a multinomial classifier based on logistic regression) to data associated with historical transactions by users in a particular industry.

Figure 7B:
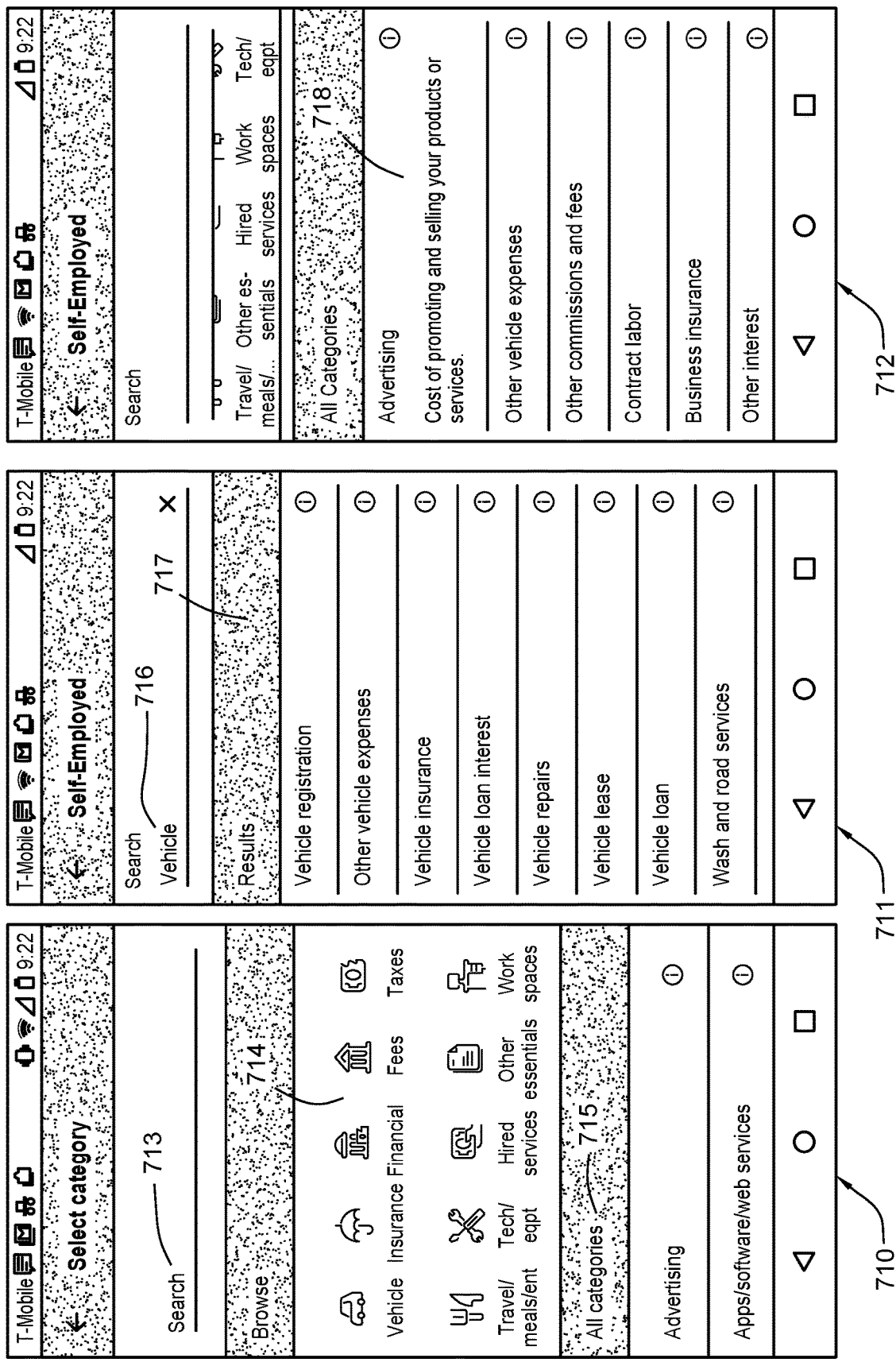

FIGS. 7A and 7B shows GUI views displayed by the financial product, in accordance with one or more embodiments. FIG. 7A shows three GUI views that might be used to view expense categories from a device such as user computing device X (102). View 701 includes a control 704 that allows a user to enter a query 708 such as "Paying others". View 701 also includes a relatively short list 705 (e.g., of hyperlinks) of expense categories called 'MY TOP CATEGORIES". In one or more embodiments, the list (105) might be based on a user's clickstream and displays the most-frequently-used (e.g., most-frequently-viewed/clicked) expense categories by the user. View 701 also includes an icon array 706 that allows the user to browse expense categories. It will be appreciated that the icon array 706 includes an icon for each one of the ten group (or top-level) categories in the expense-category hierarchy. View 701 also includes a control 707 labeled "Show all categories" that allows the user to view a list of all the individual (or bottom-level) categories in the expense-category hierarchy.

View 702 in FIG. 7A shows a view that displays as results the expense categories 709 whose keyword collections contain one or both of the keywords in the user query 708, "Paying others". View 703 in FIG. 7A shows an alphabetical listing 710 of the individual (or bottom-level) categories that are displayed when the user clicks on the control 707 labeled "Show all categories" in view 701.

FIG. 7B shows three GUI views that might be used to view expense categories from a device such as user computing device Y (103). View 710 includes a control 713 that allows a user to enter a query 716 such as "Vehicle". View 710 also includes an icon array 714 that allows the user to browse expense categories. It will be appreciated that the icon array 714 includes an icon for each one of the ten group (or top-level) categories in the expense-category hierarchy. View 710 also includes a control 715 labeled "All categories" that allows the user to view a list of all the individual (or bottom-level) categories in the expense-category hierarchy.

View 711 in FIG. 7B shows a view which displays as results the expense categories 717 whose keyword collections contain the keyword 716 "Vehicle". View 712 in FIG. 7B shows an alphabetical listing 718 of the individual (or bottom-level) categories that are displayed when the user clicks on the control 715 labeled "All categories" in view 710.

The following use cases are for explanatory purposes only and not intended to limit the scope of the invention.

In a first use case, a small business user of an online tax product is filling out her Schedule C. The user has kept a credit card chit from a meal the user bought for a client. But the user cannot remember the name of the expense category for such expenses. So she enters a query consisting of the term "guest lunch" into a search control in the online tax product's GUI. The online tax product returns the expense category named "Travel/meals/ent".

In a second use case, the software for the online tax product receives the term "guest lunch" as a query from one of its users. The software extracts two segments from the query, "guest" and "lunch". The segment "lunch" is already a keyword in the expense category named "Travel/meals/ent", but "guest" is not a keyword in any expense category. For each expense category in the expense-category hierarchy, the software applies a threshold of 0.5 to a lower-bound 95% confidence interval based on a transaction score and a user score for the term "guest". For the expense category named "Travel/meals/ent", lower-bound 95% confidence interval is 0.734, based on a normal distribution. Therefore, the software adds the term "guest" to the collection of keywords for that category.

Figure 8A:
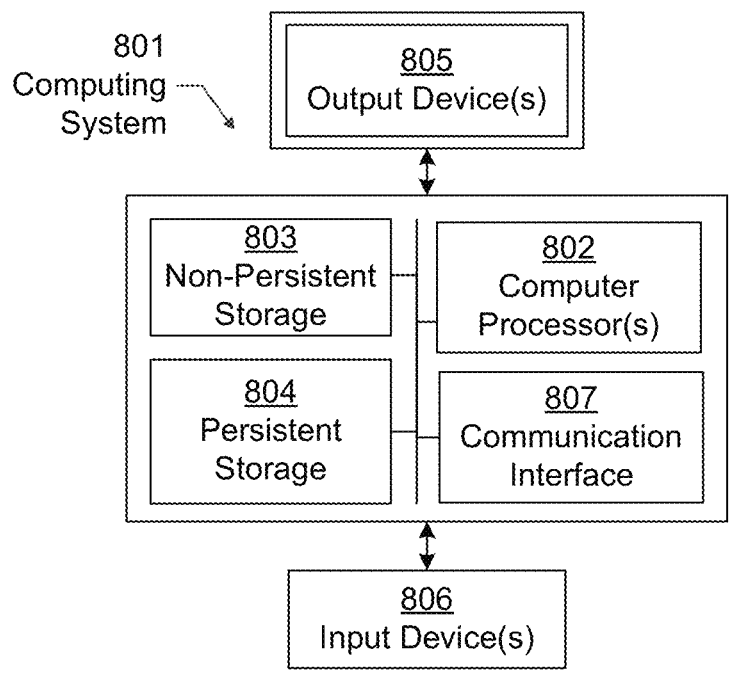
FIGS. 8A and 8B are diagrams showing a computing system, in accordance with one or more embodiments of the invention.

Embodiments of the invention, including user computing device X (102) and user computing device Y (103), may be implemented on a computing system. Any combination of mobile, desktop, server, embedded, or other types of hardware may be used. For example, as shown in FIG. 8A, the computing system 801 may include one or more computer processor(s) 802, associated memory 803 (e.g., random access memory (RAM), cache memory, flash memory, etc.), one or more storage device(s) 804 (e.g., a hard disk, an optical drive such as a compact disk (CD) drive or digital versatile disk (DVD) drive, a flash memory stick, etc.), and numerous other elements and functionalities. The computer processor(s) 802 may be an integrated circuit for processing instructions. For example, the computer processor(s) may be one or more cores, or micro-cores of a processor. The computing system 801 may also include one or more input device(s) 806, such as a touchscreen, keyboard, mouse, microphone, touchpad, electronic pen, or any other type of input device. Further, the computing system 801 may include one or more output device(s) 805, such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system 801 may be connected to a network 820 (e.g., a local area network (LAN), a wide area network (WAN) such as the Internet, mobile network, or any other type of network) via a network interface connection (not shown). The input and output device(s) may be locally or remotely (e.g., via the network 820) connected to the computer processor(s) 802, memory 803, and storage device(s) 804. Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system 801 may be located at a remote location and connected to the other elements over a network 820. Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

Figure 8B:
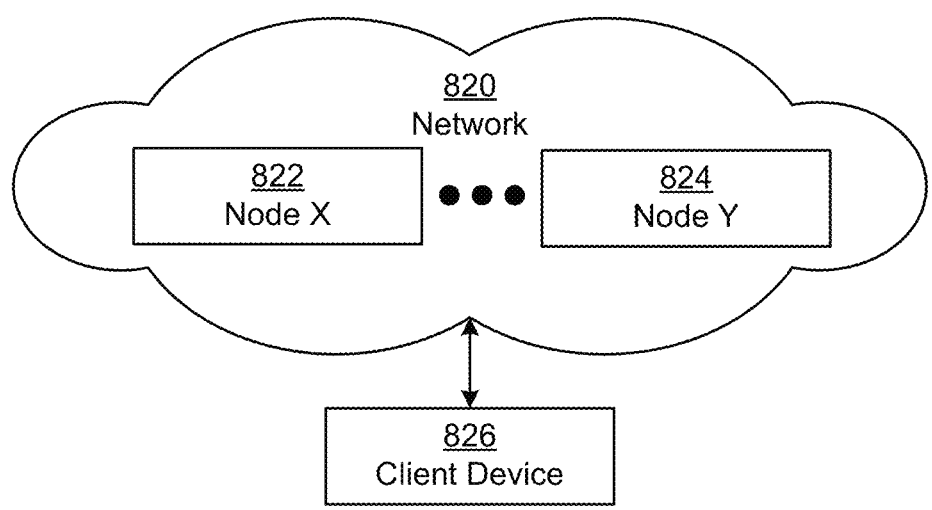

As noted above, the computing system (801) in FIG. 8A may be connected to or be a part of a network. For example, as shown in FIG. 8B, the network (820) may include multiple nodes (e.g., node X (822), node Y (824)). Each node may correspond to a computing system, such as the computing system shown in FIG. 8A, or a group of nodes combined may correspond to the computing system shown in FIG. 8A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (801) may be located at a remote location and connected to the other elements over a network.

Although not shown in FIG. 8B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (822), node Y (824)) in the network (820) may be configured to provide services for a client device (826). For example, the nodes may be part of a cloud computing system. The nodes may include functionality to receive requests from the client device (826) and transmit responses to the client device (826). The client device (826) may be a computing system, such as the computing system shown in FIG. 8A. Further, the client device (826) may include and/or perform all or a portion of one or more embodiments of the invention.

The computing system or group of computing systems described in FIGS. 8A and 8B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file.

The computing system in FIG. 8A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 8A and the nodes and/or client device in FIG. 8B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
determining, using clustered computers executing distributed-computing software, a plurality of semantic relationships between a plurality of terms in a corpus;
obtaining, from an expense category hierarchy and for an expense category in a financial management software product, a collection of keywords comprising a name and additional keywords from a description of the expense category;
expanding the collection with a related keyword according to a semantic relationship of the plurality of relationships between the related keyword and a preexisting keyword in the collection, wherein the related keyword and the preexisting keyword are in the plurality of terms;
using the clustered computers to:
extract a segment from a description of a first historical transaction by a first user of the financial management software product to obtain an extracted segment,
for the extracted segment, calculate a first confidence-interval bound for a first transaction score and a second confidence-interval bound for a first user score, and
add the extracted segment as an additional keyword to the collection by:
comparing the first confidence-interval bound to the second confidence-interval bound;
selecting, based on the comparing, a lowest value of the first confidence-interval bound and the second confidence-interval bound;
comparing the lowest value to a threshold; and
adding the extracted segment when the lowest value satisfies the threshold; and
returning the name of the expense category in response to a user submitting a first query that comprises at least one keyword in the collection.

2. The method of claim 1, further comprising:
receiving a second query from the user;
determining, for each expense category in the expense category hierarchy, that none of the keywords in second query are in the keyword collection for the expense category;
notifying the user of the determination;
receiving a selection by the user of an expense category, wherein the selection occurs during a same session; and
adding the keywords in the second query to the collection of keywords for the expense category selected by the user.

3. The method of claim 1, further comprising:
expanding the collection with a related keyword from a lexical database.

4. The method of claim 1, wherein the corpus comprises a plurality of historical transactions by users of the financial management software product, and wherein the financial management software product comprises a massively multi-user online financial management software product.

5. The method of claim 1, further comprising:
applying distributional semantics to determine the plurality of semantic relationships between the plurality of terms in the corpus.

6. The method of claim 5, wherein the distributional semantics employs at least one selected from a group consisting of a continuous bag-of-words model and a skip-gram model.

7. The method of claim 1, wherein the first transaction score is generated at least in part on re-categorization of a second historical transaction by a second user.

8. The method of claim 1, further comprising:
performing online quantitative testing to generate the expense category hierarchy.

9. The method of claim 1, wherein using the clustered computers further comprises using the clustered computers to:
calculate a first transaction score, wherein the transaction score is a first score describing a relative number of transactions stored by the financial management software product that contain the extracted segment; and
calculate a first user score, wherein the user score comprises a second score describing a relative number of users of the financial management software product who have transactions that contain the extracted segment.

10. A non-transitory computer-readable storage media comprising a program instructions, that when executed:
    determine, using clustered computers running distributed-computing software, a plurality of semantic relationships between a plurality of terms in a corpus;
    obtain, from an expense category hierarchy and for an expense category in a financial management software product, a collection of keywords comprising a name and additional keywords from a description of the expense category;
    expand the collection with a related keyword according to a semantic relationship of the plurality of relationships between the related keyword and a preexisting keyword in the collection, wherein the related keyword and the preexisting keyword are in the plurality of terms;
    use the clustered computers to:
        extract a segment from a description of a first historical transaction by a first user of the financial management software product to obtain an extracted segment,
        for the extracted segment, calculate a first confidence-interval bound for a first transaction score and a second-confidence-interval bound for a first user score, and
        add the extracted segment as an additional keyword to the collection by:
            comparing the first confidence-interval bound to the second confidence-interval bound;
            selecting, based on the comparing, a lowest value of the first confidence-interval bound and the second confidence-interval bound;
            comparing the lowest value to a threshold; and
            adding the extracted segment when the lowest value satisfies the threshold; and
    return the name of the expense category in response to a user submitting a first query that comprises at least one keyword in the collection.

11. The computer-readable storage media of claim 10, wherein the program instructions when executed further:
    receive a second query from the user;
    determine, for each expense category in the expense category hierarchy, that none of the keywords in second query are in the keyword collection for the expense category;
    notify the user of the determination;
    receive a selection by the user of an expense category, wherein the selection occurs during a same session; and
    add the keywords in the second query to the collection of keywords for the expense category selected by the user.

12. The computer-readable storage media of claim 10, wherein the program instructions when executed further:
    expand the collection with a related keyword from a lexical database.

13. The computer-readable storage media of claim 10, wherein the corpus comprises a plurality of historical transactions by users of the financial management software product, and wherein the financial management software product comprises a massively multi-user online financial management software product.

14. The computer-readable storage media of claim 10, wherein the program instructions when executed further:
    apply distributional semantics to determine the plurality of semantic relationships between the plurality of terms in the corpus.

15. The computer-readable storage media of claim 14, wherein the distributional semantics employs at least one selected from a group consisting of a continuous bag-of-words model and a skip-gram model.

16. The computer-readable storage media of claim 10, wherein the first transaction score is generated at least in part on re-categorization of a second historical transaction by a second user.

* * * * *